US 7,590,545 B2

(12) United States Patent  
Silverbrook

(10) Patent No.: US 7,590,545 B2  
(45) Date of Patent: *Sep. 15, 2009

(54) CAR MANAGEMENT SYSTEM AND ASSOCIATED PRINTER

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 872 days.

This patent is subject to a terminal disclaimer.

(21) Appl. No.: 10/503,928

(22) PCT Filed: Feb. 12, 2003

(86) PCT No.: PCT/AU03/00147

§ 371 (c)(1),  
(2), (4) Date: Aug. 9, 2004

(87) PCT Pub. No.: WO03/069511

PCT Pub. Date: Aug. 21, 2003

(65) Prior Publication Data

US 2005/0086063 A1 Apr. 21, 2005

(30) Foreign Application Priority Data

Feb. 13, 2002 (AU) ....................... PS0474

(51) Int. Cl.  
*G06Q 10/00* (2006.01)
(52) U.S. Cl. .......................... 705/1; 347/104
(58) Field of Classification Search .......... 705/1  
See application file for complete search history.

(56) References Cited

U.S. PATENT DOCUMENTS

| 5,897,602 | A | 4/1999 | Mizuta | |
|---|---|---|---|---|
| 6,115,655 | A * | 9/2000 | Keith et al. | 701/35 |
| 6,312,114 | B1 * | 11/2001 | Silverbrook | 347/85 |
| 6,529,214 | B1 * | 3/2003 | Chase et al. | 715/744 |
| 7,150,523 | B2 * | 12/2006 | Silverbrook et al. | 347/104 |
| 2002/0049535 | A1 * | 4/2002 | Rigo et al. | 701/211 |
| 2002/0085043 | A1 * | 7/2002 | Ribak | 345/810 |

FOREIGN PATENT DOCUMENTS

| EP | 231607 B1 | 1/1994 |
|---|---|---|
| JP | 59-195119 | 11/1984 |
| JP | 05-272983 | 10/1993 |
| JP | 8249413 | 9/1996 |
| JP | 09-243378 | 9/1997 |
| JP | 10-123716 | 5/1998 |
| JP | 2002127877 | 5/2002 |
| WO | WO 02/40394 A1 | 5/2002 |

OTHER PUBLICATIONS

Wayfarer Transit Systems Ltd, Wayfarer TD150—Wayfarer Depot Reader Terminal, Mar. 8, 2000, Retrieved from internet: <URL:http://webdev.archiive.org.www.wayfarer.co.uk/products/index.htm>.

* cited by examiner

*Primary Examiner*—John G Weiss  
*Assistant Examiner*—Gabrielle McCormick

(57) ABSTRACT

An information retrieval system for retrieving information relating to a conveyance includes a data collecting unit for collecting data relating to operational aspects of the conveyance. A processor communicates with the data collecting unit for processing collected data to provide formatted data suitable for printing. A printing unit, installed in the conveyance, prints the formatted data to provide information relating to the conveyance.

32 Claims, 14 Drawing Sheets

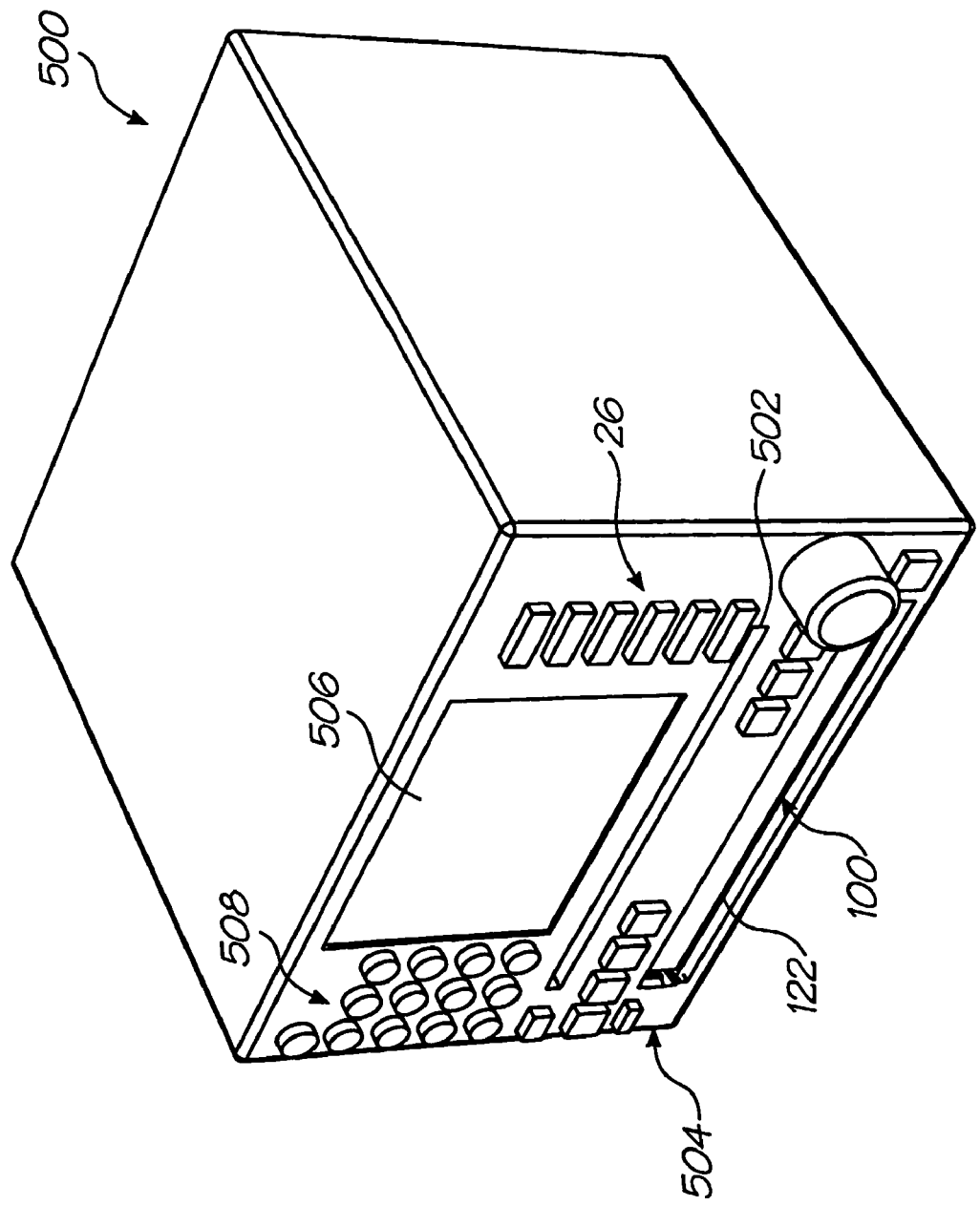

CAR MANAGEMENT SYSTEM AND ASSOCIATED PRINTER

FIELD OF THE INVENTION

The present invention relates to an information retrieval system for, and method of, retrieving information relating to a conveyance.

In this specification, unless the context clearly indicates otherwise, the term "conveyance" is to be understood in a broad sense as any suitable device for conveying persons and/or goods and includes road vehicles, aircraft, rail vehicles, waterborne craft, spacecraft, or the like.

BACKGROUND TO THE INVENTION

The integration of electronic management systems into vehicles has been increasing progressively with a corresponding reduction in the cost of components required to assemble such management systems. These management systems generally provide a host of functions including such things as monitoring of distance travelled and state of various fluids in the vehicle in order to determine when a service of the vehicle is due, manage ignition timings and other vehicle monitoring activities.

At present, as far as the applicant is aware, an output from a system of this nature is displayed as a readout on a dashboard of the vehicle. A user of the vehicle must interpret the readout in order to take appropriate action where necessary. For instance, if oil level in the vehicle is low a light may be illuminated on the dashboard indicating to a user that replenishment of the vehicle's oil supply is necessary. It may sometimes occur that the readout is transient in nature and does not re-occur, which can cause frustration at the time of servicing of the vehicle. Thus, it would be useful to have a means of recording information relating to the readout when such an event occurs for later analysis and, if necessary, remedial action to be taken.

CO-PENDING APPLICATIONS

Various methods, systems and apparatus relating to the present invention are disclosed in the following co-pending applications filed by the applicant or assignee of the present invention simultaneously with the present application:

| | | | | | |
|---|---|---|---|---|---|
| AP39 | AP43 | AP44 | AP46 | AP47 | AP48 |
| AP49 | AP50 | AP51 | AP52 | AP53 | AP55 |
| AP58 | AP60 | AP61 | AP62 | AP63 | AP64 |
| AP65 | AP66 | AP67 | AP68 | AP69 | AP70 |
| AP71 | AP77 | AP78 | AP79 | | |

The disclosures of these co-pending applications are incorporated herein by cross-reference. Each application is temporarily identified by its file reference. This will be replaced by the corresponding PCT Application Number when available.

RELATED PATENT APPLICATIONS AND PATENTS

| | | | | |
|---|---|---|---|---|
| 6,566,858 | 6,331,946 | 6,246,970 | 6,442,525 | PCT/AU01/00141 |
| 09/505,951 | PCT/AU01/00139 | 6,816,968 | 6,757,832 | PCT/AU01/00140 |
| PCT/AU00/00741 | 6,238,044 | PCT/AU00/00742 | 6,425,661 | 6,227,652 |
| 6,213,588 | 6,213,589 | 6,231,163 | 6,247,795 | 6,394,581 |
| 6,244,691 | 6,257,704 | 6,416,168 | 6,220,694 | 6,257,705 |
| 6,247,794 | 6,234,610 | 6,247,793 | 6,264,306 | 6,241,342 |
| 6,247,792 | 6,264,307 | 6,254,220 | 6,234,611 | 6,302,528 |
| 6,283,582 | 6,239,821 | 6,338,547 | 6,247,796 | 6,557,977 |
| 6,390,603 | 6,362,843 | 6,293,653 | 6,312,107 | 6,227,653 |
| 6,234,609 | 6,238,040 | 6,188,415 | 6,227,654 | 6,209,989 |
| 6,247,791 | 6,336,710 | 6,217,153 | 6,416,167 | 6,243,113 |
| 6,283,581 | 6,247,790 | 6,260,953 | 6,267,469 | 6,273,544 |
| 6,309,048 | 6,420,196 | 6,443,558 | 6,439,689 | 6,378,989 |
| 6,848,181 | 6,634,735 | PCT/AU98/00550 | PCT/AU00/00095 | 6,390,605 |
| 6,322,195 | 6,612,110 | 6,480,089 | 6,460,778 | 6,305,788 |
| PCT/AU00/00172 | 6,426,014 | PCT/AU00/00338 | 6,364,453 | PCT/AU00/00339 |
| 6,457,795 | PCT/AU00/00581 | 6,315,399 | PCT/AU00/00580 | 6,338,548 |
| PCT/AU00/00582 | 6,540,319 | PCT/AU00/00587 | 6,328,431 | PCT/AU00/00588 |
| 6,328,425 | PCT/AU00/00589 | 6,991,320 | PCT/AU00/00341 | 6,595,624 |
| PCT/AU00/00340 | PCT/AU00/00749 | 6,417,757 | PCT/AU01/01332 | 7,095,309 |
| PCT/AU01/01318 | 6,854,825 | PCT/AU00/00750 | 7,075,677 | PCT/AU00/00751 |
| 6,428,139 | PCT/AU00/00752 | 6,575,549 | PCT/AU01/00502 | PCT/AU00/00583 |
| 6,383,833 | PCT/AU02/01120 | PCT/AU00/00593 | 6,464,332 | PCT/AU00/00333 |
| PCT/AU00/01513 | 6,428,142 | PCT/AU00/00590 | 6,390,591 | PCT/AU00/00591 |
| 7,018,016 | PCT/AU00/00592 | 6,328,417 | PCT/AU00/00584 | 6,322,194 |
| PCT/AU00/00585 | 6,382,779 | PCT/AU00/00586 | 6,629,745 | PCT/AU00/01514 |
| 6,565,193 | PCT/AU00/01515 | 6,609,786 | PCT/AU00/01516 | 6,609,787 |
| PCT/AU00/01517 | 6,439,908 | PCT/AU00/01512 | 6,684,503 | PCT/AU00/00753 |
| 6,755,513 | PCT/AU00/00594 | 6,409,323 | PCT/AU00/00595 | 6,281,912 |
| PCT/AU00/00596 | 6,604,810 | PCT/AU00/00597 | 6,318,920 | PCT/AU00/00598 |
| 6,488,422 | PCT/AU01/01321 | 6,655,786 | PCT/AU01/01322 | 6,457,810 |
| PCT/AU01/01323 | 6,485,135 | PCT/AU00/00516 | 6,795,215 | PCT/AU00/00517 |
| 7,154,638 | PCT/AU00/00511 | 6,859,289 | PCT/AU00/00754 | 6,977,751 |
| PCT/AU00/00755 | 6,398,332 | PCT/AU00/00756 | 6,394,573 | PCT/AU00/00757 |
| 6622923 | | | | |

SUMMARY OF THE INVENTION

According to a first aspect of the invention, there is provided an information retrieval system for retrieving information relating to a conveyance, the system including:

a data collecting means for collecting data relating to operational aspects of the conveyance;

a processing means, in communication with said data collecting means, for processing said collected data to provide formatted data suitable for printing; and a printing unit, installed in said conveyance, for printing said formatted data to provide information relating to said conveyance.

The data collecting means may include a conveyance management sub-system which obtains details of predetermined operating parameters, such as fluid levels, fluid temperatures, etc., and related information of the conveyance, such as distance travelled, speed, etc. The sub-system may periodically produce information for viewing by the user without user intervention. In addition, or instead, the sub-system may include a user terminal to enable the user to access required information on demand.

The data collecting means may include a location determining unit for determining the location of the conveyance. The location determining unit may provide the location of the conveyance as a set of coordinates. Thus, the location determining unit may comprise a global positioning system (GPS) receiver.

The data collecting means may further include a locality data retrieval unit, which retrieves data relating to the location in response to the receipt of data from the location determining unit. The location data retrieval unit may comprise a locality information sub-system, which provides data relating to an establishment of relevance to a user of the conveyance.

The processing means may include a layout engine in communication with the data collecting means. The layout engine may lay out data elements to be communicated to the printer.

The processing means may comprise a data manipulating means in communication with the layout engine for manipulating the data to provide the formatted data.

The printing unit may include a printer controller, for receiving the formatted data to be printed, and a printer. The printer may be a full color printer. Preferably, the printer is a photo quality color printer.

Further, the printer may be an ink jet printer. The printer may therefore comprise a pagewidth ink jet printhead. The printhead may comprise an array of nozzles, said array being fabricated by microelectromechanical techniques.

According to a second aspect of the invention, there is provided a method of retrieving information relating to a conveyance, the method including the steps of:

collecting data relating to operational aspects of the conveyance;

processing said collected data to provide formatted data suitable for printing; and printing said formatted data when required by a user, on a printing unit installed in said conveyance, to provide the user with information relating to said conveyance.

The method may include obtaining details of operating parameters and related information of the conveyance. The method may then include periodically producing information for viewing by the user without user intervention. In addition, or instead, the method may include enabling the user to access required information on demand.

Further, the method may include determining the location of the conveyance. The method may thus include providing the location of the conveyance as a set of co-ordinates.

Still further, the method may include retrieving data relating to a locality in which the conveyance is located. The method may include providing data relating to an establishment in the locality that is of relevance to the conveyance.

Additionally, the method may include laying out data elements to be printed. The method may include manipulating said data elements prior to printing the data to provide said formatted data.

According to a third aspect of the invention, there is provided an onboard information retrieval system for retrieving information relating to a vehicle, the system including:

a data collecting means for collecting data relating to operational aspects of the vehicle;

a processing means for processing said collected data to provide formatted data which is in a suitable format for printing; and an onboard printing unit for printing said formatted data, on demand, to provide information relating to the locality.

In this specification, unless the context clearly indicates otherwise, the term "onboard" is to be understood in a broad sense as a device and its components, which are mounted in a conveyance or vehicle.

The information may include information relating to replenishable items of the vehicle. Further, the information may include information regarding establishments in a locality in which the vehicle is located which is of use in maintenance of the vehicle. The establishments may include service stations.

According to a fourth aspect of the invention, there is provided a method of retrieving information relating to a vehicle, the method including the steps of:

collecting data relating to operating aspects of the vehicle;

processing said collected data to provide formatted data which is in a suitable format for printing; and printing said formatted data on an onboard printer to provide information relating to the vehicle.

The method may include providing information relating to replenishable items of the vehicle Further, the method may include providing information regarding establishments in a locality in which the vehicle is located which is of use in maintenance of the vehicle. Thus, the method may include providing information on the location of service stations in the locality.

According to a fifth aspect of the invention, there is provided an onboard information retrieval system for retrieving information relating to a vehicle, the system including:

a vehicle management system for providing information on various operating aspects of the vehicle;

a position sensing means carried by the vehicle for sensing the position of the vehicle in a locality and to provide location data;

a locality data retrieval unit for use in association with the position sensing means and for retrieving predetermined data relating to the locality;

a user terminal, operable by a user to obtain predetermined data;

a layout engine responsive to the user terminal for processing the predetermined data into data elements;

a pre-printing processing means which is connected to the layout engine and which processes the data to provide formatted data which is in a format which is suitable for printing; and an onboard printer for printing the formatted data, on demand, to provide a hard copy of the information.

According to a sixth aspect of the invention, there is provided a method of retrieving information relating to a vehicle, the method including the steps of:

providing information on various operating aspects of the vehicle;

sensing the position of the vehicle in a locality and providing location data;

retrieving predetermined data relating to the locality;

obtaining desired data by means of a user terminal, operable by a user;

processing the predetermined data at least into data elements;

further processing the data to provide formatted data which is in a format which is suitable for printing; and printing the formatted data, on demand, via an onboard printer to provide a hard copy of the information relating to the vehicle.

BRIEF DESCRIPTION OF THE DRAWINGS

A preferred embodiment of the invention will now be described, by way of example only, with reference to the accompanying drawings, in which:

FIG. 17 shows a three dimensional view of an implementation of the information retrieval system

DETAILED DESCRIPTION OF PREFERRED EMBODIMENT

Figure 1:
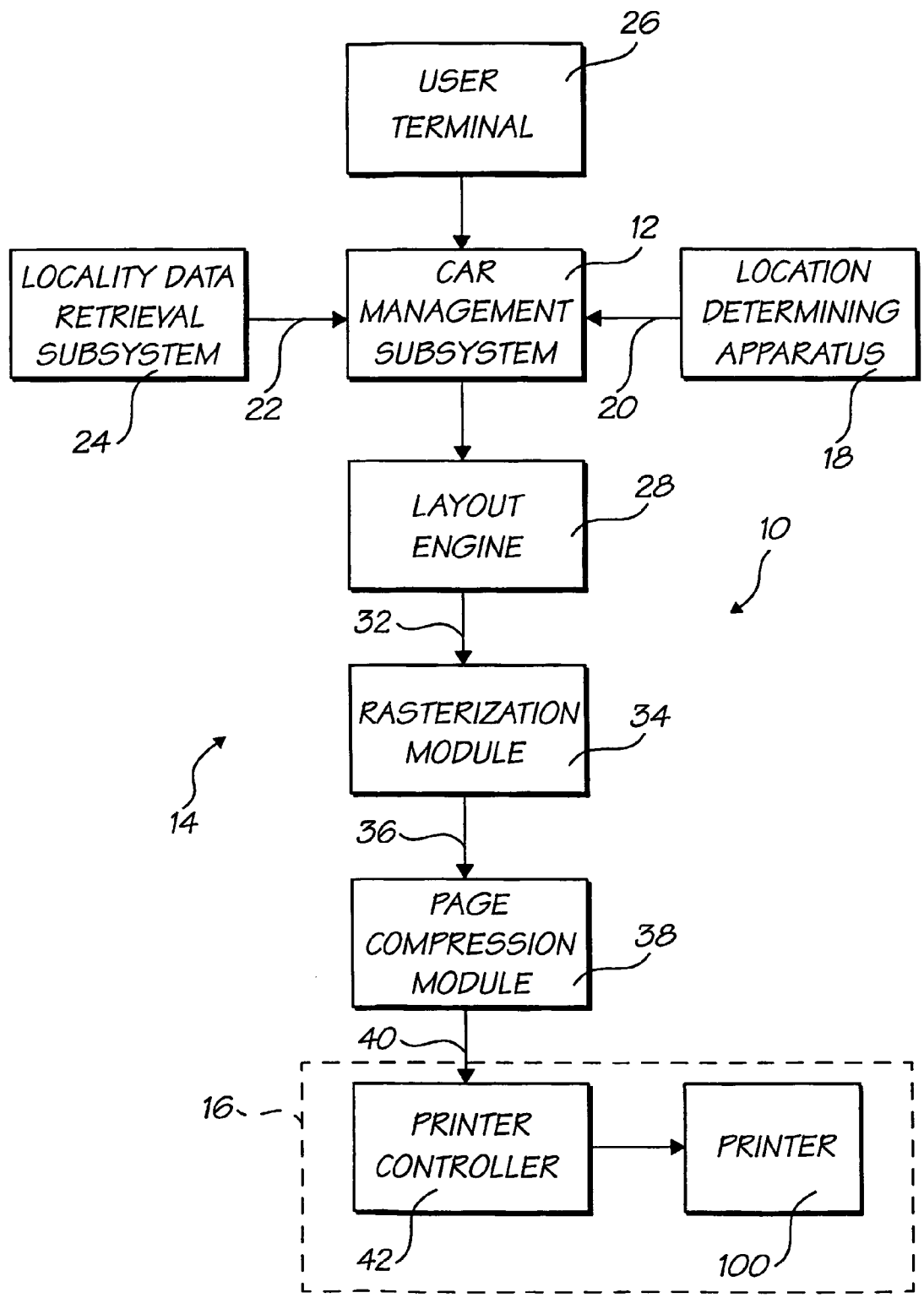
FIG. 1 shows a block diagram of an information retrieval system, in accordance with the invention, for retrieving information relating to a conveyance.
Figure 2:
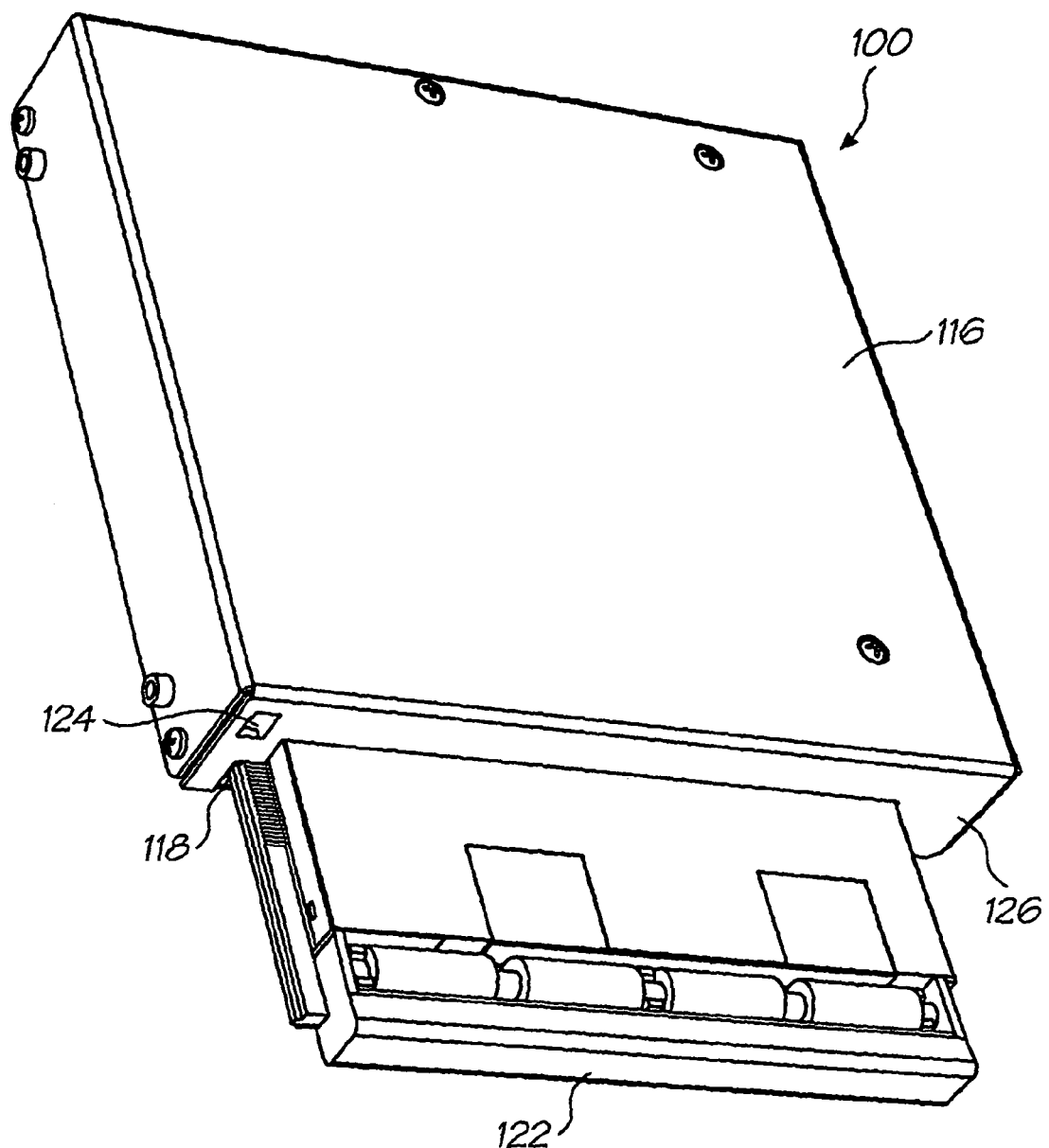
FIG. 2 shows a three dimensional view of a printer for use with the system.

Referring initially to FIG. 1 of the drawings, reference numeral 10 generally designates an information retrieval system, in accordance with the invention, for retrieving information relating to a conveyance, more particularly, a motor vehicle.

The system 10 includes a vehicle management sub-system 12 that monitors operating parameters of the vehicle. More particularly, the sub-system 12 monitors fluid levels, fluid condition and various other parameters such as distance travelled by the vehicle, speed of the vehicle, stopping and starting of the vehicle, brake pad conditions, or the like. It is also now possible for vehicles to monitor other aspects of operating parameters such as suspension settings, tyre pressures, or the like.

The system 10 further includes a user terminal that enables a user of the system to request required information from the vehicle management sub-system 12. The user terminal 26 includes a display and user interface. In addition to information being requested by the user via the user terminal 26, the system 10 may, periodically, cause information to be displayed on the display of the user terminal 26 without any intervention by the user.

The system 10 further includes a data collecting means comprising a location determining unit 18 and a locality data retrieval sub-system 24. The data collecting means collects data relating to a location of the motor vehicle and a locality in which the motor vehicle is positioned.

Figure 15:
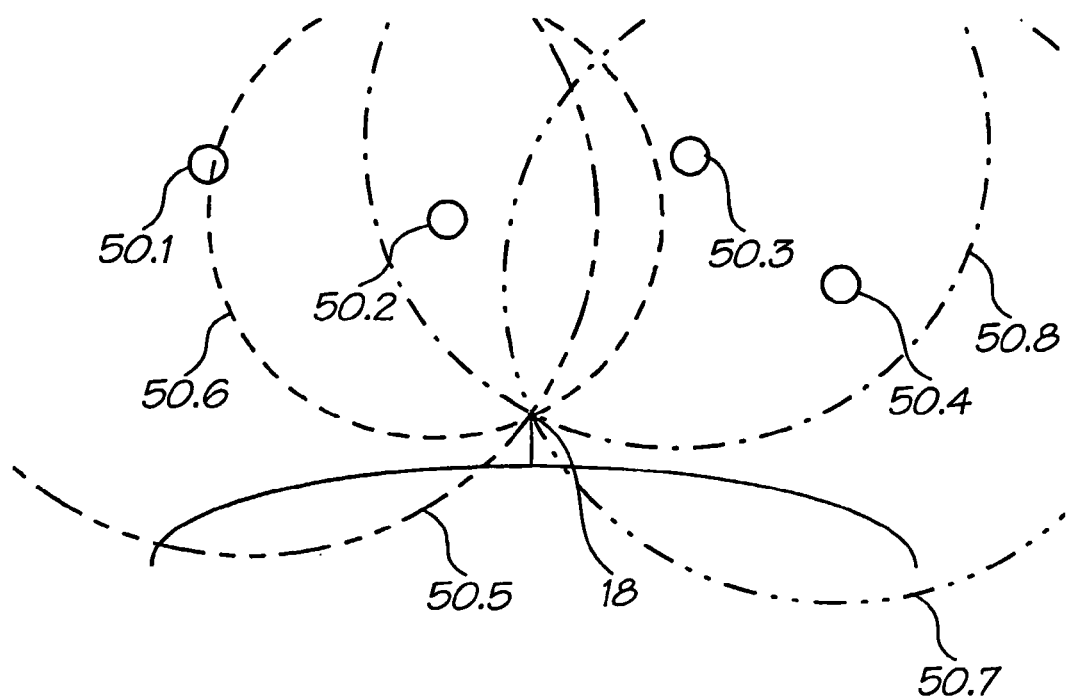
FIG. 15 shows a schematic diagram of one embodiment of a position sensing system for use with the information retrieval system of FIG. 1.

The location determining unit is, in one embodiment as shown in FIG. 15, a global positioning system (GPS) receiver 18. The receiver 18 provides coordinates in the form of location data on an output line 20 to the vehicle management sub-system 12. The data output on line 20 is also made available to the locality data retrieval sub-system 24. The sub-system 24 is able to be interrogated by the user of the user terminal 26 so that relevant data regarding establishments in the locality that may be of use to the user can be displayed on the display of the user terminal 26. The data regarding the locality would, typically, relate to locations of service stations, filling stations, motor spares stores, mechanical workshops, or the like which are in the locality in which the vehicle is positioned. The sub-system 24 produces the locality data on a data line 22 to the vehicle management sub-system 12.

The system 10 includes a processing means 14 that processes data output from the vehicle management sub-system 12. The processing means 14 includes a layout engine 28. The sub-system 12 produces content and layout information based on details to be printed relating to vehicle management parameters. This content and layout information is sent via the sub-system 12 to the layout engine 28. The layout engine 28 produces descriptions of one or more pages based on text and data content and any layout information provided. Each page is described by way of an appropriate page description language such as postscript or PDF.

The processing means further includes a rasterization module 34 that communicates with the layout engine via a data line 32. A page compression module 38 is connected to an output of the rasterization module via a data line 36. A page description output by the layout engine 28 on the data line 32 is fed to the modules 34 and 38 for rasterization, compression and output of data to be printed in a suitable format on data line 40.

Data line 40 connects an output of the page compression module 38 to a printer controller 42 of a printing unit 16 of the system 10. The printer controller 42 controls a printer 100 on which required information relating to management of the vehicle can be printed.

Certain of the components of the system 10 are now described in greater detail.

In the first embodiment of the receiver 18, use is made of the global positioning system (GPS). The GPS consists of 24 satellites orbiting the earth in a fixed pattern such that from any point within range of the GPS, at least four satellites are visible. It is this line-of-sight to at least four satellites that enables the determination of a number of parameters relating to the location of the GPS receiver 18. In FIG. 15 of the drawings, four satellites 50.1-50.4 and their associated transmission foot prints 50.5 to 50.8, respectively, are shown In a two dimensional projection.

Those skilled in the art will understand that each of the satellites 50.1-50.4 contains a high accuracy atomic clock and also ephemeris data. The ephemeris data and the current time are transmitted by each satellite 50.1-50.4 at fixed intervals so that they may be received by the GPS receiver 18. By comparing the time at the GPS receiver 18 with the time received by way of the satellite transmissions, it is possible to calculate the distance between the receiver 18 and each of the satellites 50.1-50.4. With the addition of the ephemeris data, the positions of the satellites 50.1-50.4 are also available. Given these two pieces of information, it is possible to narrow down the position of the receiver 18 to a point on a sphere centred on the satellites 50.1-50.4. With four sets of data from the four satellites 50.1-50.4, the intersections of each of these spheres 50.5-50.8 yields X, Y and Z co-ordinates of the GPS receiver 18 and also an accurate measure of UTC time. A transformation of these co-ordinates yields the receiver's position in terms of latitude, longitude and height above sea level.

To overcome the uncertainty of the GPS created by the introduction of "selective availability" into the GPS by the US military, an enhanced GPS, known as dGPS or differential GPS can be used. This uses a differential signal where it is available. dGPS uses a fixed reference base station equipped with a GPS receiver in addition to a portable receiver. The fixed receiver transmits a signal representing the error in the GPS signal that it receives to the portable receiver. The portable receiver then uses this signal to reduce the error in its position estimation.

Figure 16:
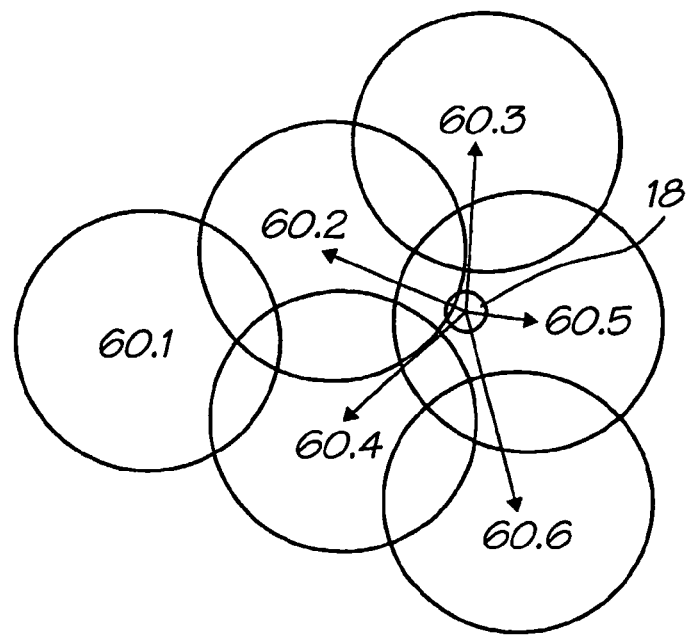
FIG. 16 shows a schematic diagram of another embodiment of a position sensing system for use with the information retrieval system of FIG. 1.

In another embodiment of the invention, instead of using the GPS or in addition to it, a mobile phone network could, instead be used as shown in FIG. 16. It is only possible to use this network in populated areas in which a number of mobile phone base stations are located such as within the boundaries of a city.

A typical mobile telephone network consists of a number of base stations 60.1-60.6 (FIG. 16).

Each base station 60.1-60.6 transmits in a predetermined area or foot print to define a cell. The distance between adjacent base stations is usually arranged so that the size of each cell is large enough to provide a degree of overlap between it and its neighboring cells. This allows a user to roam over the coverage area whilst still having access to telephone services since they are always in the area of at least one cell.

As a user moves within a cell, the strength of the signal that it receives from that cell varies depending on a number of factors including the distance from a base station 60.1-60.6. As a user moves between cells, the handset typically switches from using the base station corresponding to the cell with a lower signal strength to a base station corresponding to a cell with a higher signal strength in order to maintain service quality.

Given the distribution of cells and the ability of a handset to emit a signal that may be received by more than one base station as it propagates, it is possible to conceive of a traffic controlling mechanism in which the location of a handset may be determined to within a certain degree of accuracy, possibly an accuracy of about ten meters.

A number of different techniques may be employed to locate the handset functioning as a receiver 18. The selected technique depends mainly on the type of technology of the handset and its network. Generally, differences between the times of arrival of access bursts generated by the handset 18 can be used to triangulate the position of the receiver 18 by calculating the distance from three base stations to the receiver 18. The reverse of this technique, whereby the receiver 18 determines its location based on access bursts generated by nearby base stations, can also be used by incorporating specialised location determining functionality into the receiver 18.

It will be appreciated that a combination of mobile telephone networks and the GPS can be used yielding a system called Assistance-GPS.

The locality data retrieval sub-system 24 comprises a combination of a locality data server and a corresponding access mechanism. Once again, the type of access mechanism used will depend on the locality data server.

A locality data server is similar to a combination of the services that a tourist bureau, local newspaper and current events hotline may provide. The server maintains a database of a variety of up-to-date information from a large variety of sources that may be of interest to a target user of the system 10. Information stored on the locality server is retrieved according to a number of categories including the time of day at which the request is made, the specific location of a user (including indications of their potential immediate destinations) the task that a user is involved in (as a tourist the goals of a user would be vastly different from a shopper) and general information about the user that may be provided by the user using the user terminal 26.

Based on information supplied by the user via the user terminal 26, locality information is supplied that is comprised of a number of elements that can be printed or of some other nature. This includes both images, text and potentially layout information that may be used or ignored by the user. In the context of this invention, the type of information that is made available to a user is in regard to the location of vehicle maintenance establishments in the locality such as filling stations, vehicle service establishments, or the like.

The server may be a shared resource, which is accessible by way of a network. In this way, the server can be updated regularly to provide information that is up-to-date and relevant.

A portable version of a locality data server is also possible such as by way of a subscription service in which media containing locality information is delivered to a user on a regular basis. This media may then be used with a corresponding reader and access mechanism to retrieve information that is relevant to the user's current requirements.

The layout engine 28 may be required to manipulate data sourced from a plurality of sources. This data may have no embedded layout information. Depending on the kind of content supplied, it may be necessary to firstly create a formatted description of the content, which can then be used to generate one or more pages of page description language.

The page description language to be generated by the layout engine 28 determines the kinds of data elements, and the structuring of elements that may be used to compose a page. For example, if the page description language used is postscript, then the elements that are used to describe the page include filled and stroked paths consisting of line segments and curves, text with corresponding font definitions, and images.

A template for laying out data may be dynamically generated by the layout engine 28 based on user choices, may be a static built-in template, or may even be obtained from some other source such as the source suppling the data.

A number of possibilities exist for layout and content descriptions that can be used to generate a set of consistent layouts for a page containing a number of elements, which may be both textual and graphical.

One example of a method of data layout that allows data to be sourced from a plurality of separate locations is through using a combination of XML (extensible Markup Language) and XSL (extensible Stylesheet Language).

XML allows content to be marked up by applying a set of tags to the content. The definition of each tag inparticular XML content is described in a separate scheme referenced by the XML.

XSL provides a method of transforming XML into another format (for example HTML) whilst simultaneously performing selection and filtering operations.

The combination of XML content and XSL as a layout specification allows for descriptions of one or more pages to be produced in a formatting language. The formatting language may then be translated into a page description language suitable for printing (ie, one that provides descriptions of objects, their locations and compositing details).

Another possible layout and content description which can be used is a document which is specified in HTML (Hyper Text Markup Language) which is supplied to the layout engine 28 for the purposes of creating a page description. One or more stylesheets specified according to CSS (Cascading Style Sheet) standard may also be supplied, allowing the layout engine 28 to associate a supplied style with a set of tags. If no style sheet is supplied a set of default styles internal to the layout engine 28 is adopted.

The HTML document is then translated into a page description language suitable for printing.

The rasterization module 34 is provided to convert from page description language into a format that can be sent to the print engine (not shown) of the printer 100. This format may take a number of forms depending on the characteristics of the print engine such as the color gamut of the output device, the types of markers to be used, the number of markers being used (and their respective colors) and the medium being marked.

The page description received by the rasterization module 34 may also take a number of forms. Many page description languages are program oriented in that a page is described in a pragmatically generated manner. Other page description languages describe pages in terms of a set of objects placed on a page by way of a painter's algorithms. Still other page description languages describe a page in terms of a compositing model that defines a hierarchy of objects located on a page, each with a defined compositing order relative to a neighborhood of other objects.

A number of ways exist in which rasterization of a page, a set of pages, a sub-set of objects on a page or a sub set of objects on a number of pages may be processed by the rasterization module 34.

One method of rasterization involves a divide-and-conquer approach in which the page description language is initially interpreted to form a model of the page. The page is scanned and objects are rasterized as they are encountered and then composited to form pixmap output for a portion of the page. The pixmap is then mapped into the color space of the output device or dithered (or error defused) to match the characteristics required by the output device.

Another method of rasterization which may be employed by the rasterization module 34 is to render each object in full or partially according to the type of object the coverage of the object with respect to the page (and the portion of the page currently being rendered) and caching aspects of the object For instance, if a character string is to be rasterized, each character in the string may be rasterized in full and then cached for later reuse whereas a filled rectangle may only be rasterized as necessary.

Depending on the output requirements for the rasterization module 34, each page to be rasterized may be generated in its entirety or generated in a band wise fashion for forwarding to the page compression module 38. In this way, if a page is larger than a certain size, and memory needs to be conserved, a page may be divided into a number of bands that may be rasterized on demand.

The page compression module 38 is provided to reduce the amount of rasterized page data that needs to be transferred to the printer controller 42. The page data is compressed using one or more of a number of techniques that do not result in a visible degradation in the quality of the final printed image.

A method of compressing contone data is JPEG compression. With this compression technique, contone pixels are converted into a luminance/chrominance representation which may then efficiently be compressed by using quantization of a discrete cosine transformation of the data. This quantized version of the data is entropy coded to reduce large runs of zero valued elements resulting in an overall 10:1 reduction in data size with virtually no resulting significant loss of image quality.

The wavelet transform, as adopted by the JPEG 2000 standard, is a method used to compress contone data. Two different wavelet transforms are specified by JPEG 2000, namely, a 9/7 wavelet transform for lossy compression and a 5/3 3 wavelet transform for lossless compression. Given that the results of compression using the 9/7 wavelet transform are visually superior to the results of compression using the discrete cosine transform, it is reasonable to expect that a compression ratio of at least 50:1 can be achieved without significant degradation of the reconstructed image.

The scan order adopted by JPEG 2000 is a spiral scan of the original image, traversed one pixel at a time. This is not convenient for printing applications since it would require that the complete page be decoded and stored or that the page be decoded multiple times for printing to be carried out To remedy this, it may be possible to adopt an alternative scan order that traverses each image row in sequence such that each portion of the image received can be immediately decoded and printed independently of the receipt of the complete compressed page.

Compression of bilevel images may be performed by using the commonly known Group 3 or Group 4 fax algorithms. These algorithms exploit the two dimensional properties of typical bilevel images to achieve an average 30:1 compression.

The JBIG (Joint Bilevel Image Group) has defined a method for the compression of bilevel images called JBIG2 that is able to yield higher compression ratios than the older Group 3 and Group 4 fax algorithms with a more complex encoder/decoder combination Essentially JBIG2 relies on the encoder to successfully segment an input image into a number of regions that are compressed with techniques specialised according to the properties of the region being encoded. Regions that contain text elements are encoded using an algorithm that stores encoded versions of bitmaps corresponding to each character. Regions that contain half toned images (particularly for the case when ordered half toning has been used) are encoded by storing a dictionary of half toned patterns and the regions to which they apply. Regions that contain other elements such as line art are encoded into a compressed bitmap representation.

In certain instances, page compression may not be required. In that case, the page compression module 38 functions using null compression wherein the page is not compressed at all and the page compression module 38 functions as a pass through module.

The printer controller 42 is responsible for handling the hardware specific aspects of the printing process. This enables a number of different types of printing mechanisms or printers 100 to be adopted without changing details of the system further up the chain of print modules.

The printer controller 42 receives a rasterized version of each page which is usually compressed using one of the compression techniques described above. The page may be received in its entirety or in a band-wise fashion depending on the size of the page and the functioning of the preceding modules 34 and 38.

In the printer controller 42, the page data are progressively accessed in printer order, decompressed if required and organised into a format suitable for hardware of the printer 100 to enable the hardware of the printer 100 to program its printhead 300. This recognition may include such factors as may be necessary to account for special characteristics of a particular printhead 300 such as up scaling and dithering of the print data and adjustments, if necessary, for the markers and paper being used.

Referring to FIGS. 2 to 7 of the drawings, the printer 100 is described in greater detail.

The printer 100 includes a chassis 112 (FIG. 3) which is covered by a top cover 116. The printer 100 has an access opening 118 in the top cover. The access opening 118 is closed off by a flap 120. The flap 120 is spring biased so that, when a cartridge 122 has been removed from the printer 100, the flap is urged upwards to close off the access opening 118.

The device which sends commands to the printer 100 can either be hard wired to the printer 100, for example, via a wiring loom of the motor vehicle or, instead, the device may send commands to the printer 100 in a wireless manner. For this purpose, the printer 100 includes a port 124 able to detect wireless communications, such as infra-red communications.

Figure 3:
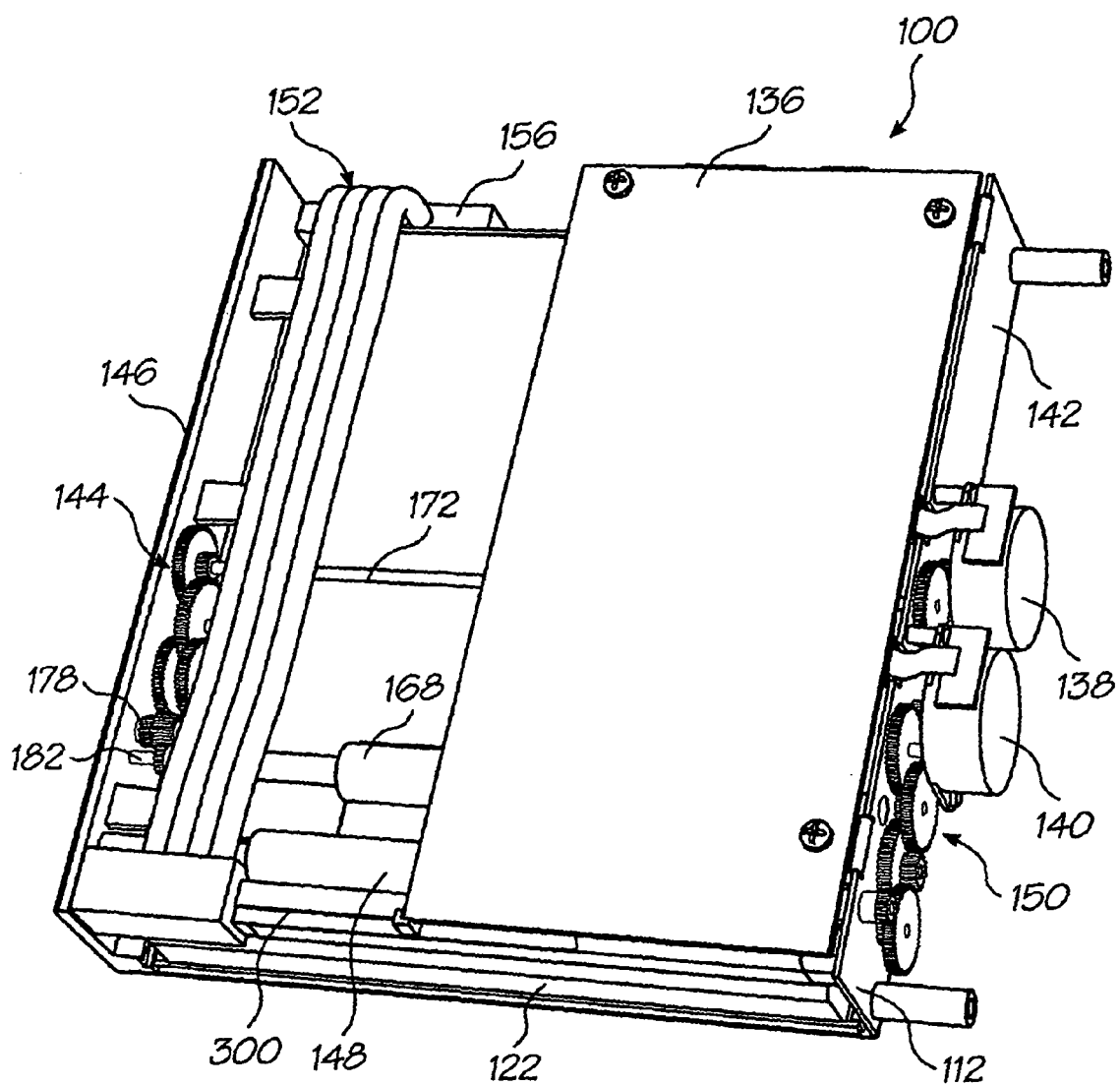
FIG. 3 shows a three dimensional view of the printer with a cover removed.

The printer 100 incorporates a printhead 300 (FIG. 3). The printhead 300 is a pagewidth ink jet printhead. More particularly, the printhead 300 is a four color printhead, or three color plus infra red ink, printhead which prints photo quality prints on print media stored in the cartridge 122. The printhead 300 comprises an array of nozzles to provide printing at 1600 dpi. The nozzles of the printhead 300 are manufactured using the applicant's Memjet technology. The printhead is described in greater detail below.

The printhead 300 receives commands from a printed circuit board (PCB) 136 secured to the chassis 112.

A pair of drive motors 138 and 140 is mounted on a sidewall 142 of the chassis 112. The drive motor 138, which is in the form of a stepper motor, drives a first drive arrangement in the form of a first gear train 144. The first gear train 144 is mounted on a side molding 146 of the chassis 112.

The drive motor 140, which is also in the form of a stepper motor, drives a drive roller 148 via a second drive arrangement in the form of a second gear train 150.

The printhead 300 receives ink from ink hoses 152 which communicate with an ink supply reservoir 154 (FIG. 7) of the cartridge 122 via an ink supply manifold 156, as will be described in greater detail below.

Figure 4:
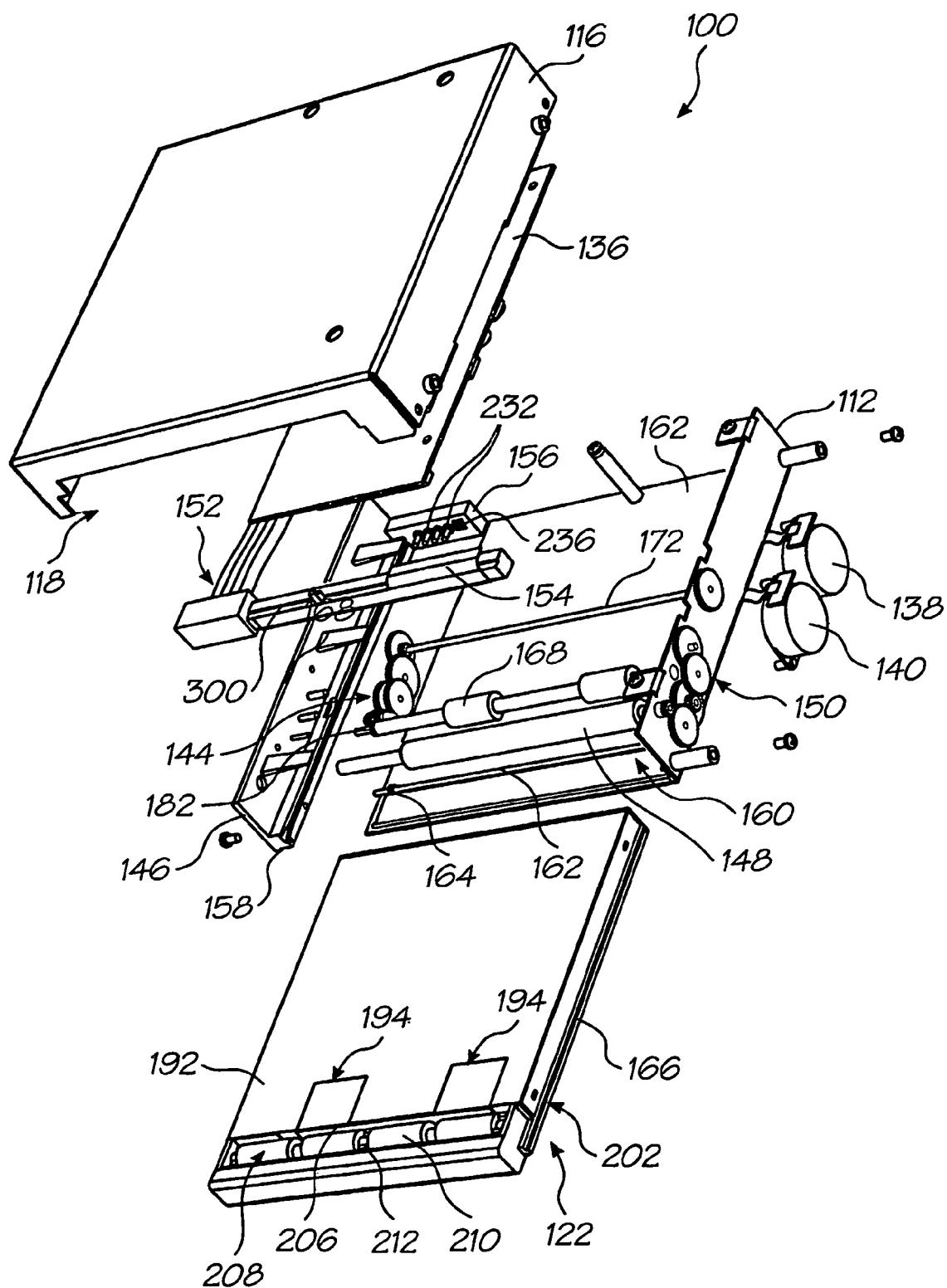
FIG. 4 shows a three dimensional, exploded view of the printer.
Figure 5:
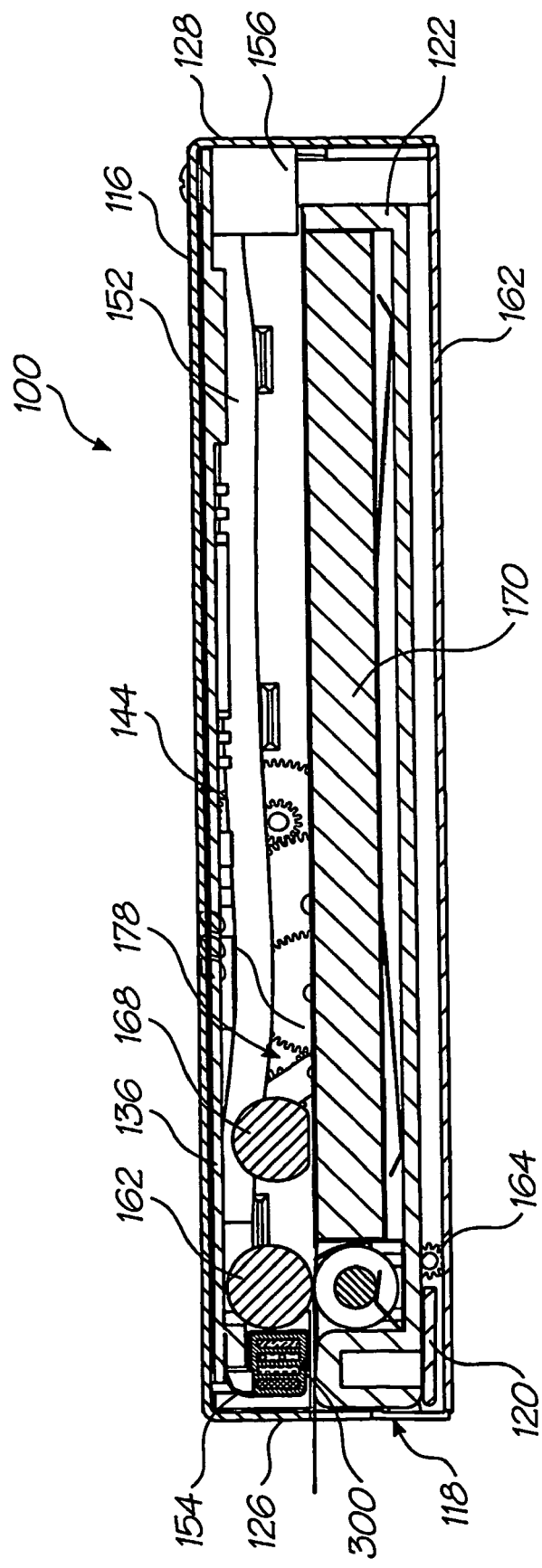
FIG. 5 shows a sectional side view of the printer.

Referring to FIG. 4 of the drawings, an exploded view of the printer 100 is illustrated. It is to be noted that the printhead 300 communicates with the PCB 136 via a TAB film 154.

A slot 158 is defined in the side molding 146. The slot 158 receives a corresponding formation of the cartridge 122 in it Further, a roller set 160 is mounted on a base 162 of the printer 100. The roller set 160 comprises a rotatable axle 162. A cog 164 is mounted proximate each end of the axle 162. Each cog 164 engages a longitudinally extending rack 200, 202, one on each side of the cartridge 122, for inhibiting skewing of the cartridge 122 as it is inserted into, or withdrawn from, the printer 100.

The first gear train 144 engages a pick up roller 168 of the printer 100. The pick up roller 168 picks up print media in the form of a sheet of paper from a stack 170 of paper (FIG. 5) in the cartridge 122 for feeding to the printhead 300 of the printer 100 when printing is to be effected.

As shown in greater detail in FIG. 4 of the drawings, the first gear train 144 is powered by the stepper motor 138 via an axle 172 extending across the printer 100 to convey power from the stepper motor 138 to the first gear train 144. A gear 174 is mounted against the molding 146 at one end of the axle 172. The gear 174 drives a reduction gear set 176. Further, the reduction gear set 176 communicates with a reversing mechanism 178. Accordingly, the gear train 144 performs two functions. When the reversing mechanism 178 is not selected, the gear train 144 engages an upper rack 180 on the cartridge 122 for feeding the cartridge 122 into the printer 100 or ejecting the cartridge 122 from the printer 100. Instead, when the reversing mechanism has been selected, it engages the pick up roller 168 or, more particularly, a gear 182 mounted at an end of the pick up roller 168. The gear train 144 then serves to feed the paper to the drive roller 148 for conveying to the printhead 300.

Figure 6:
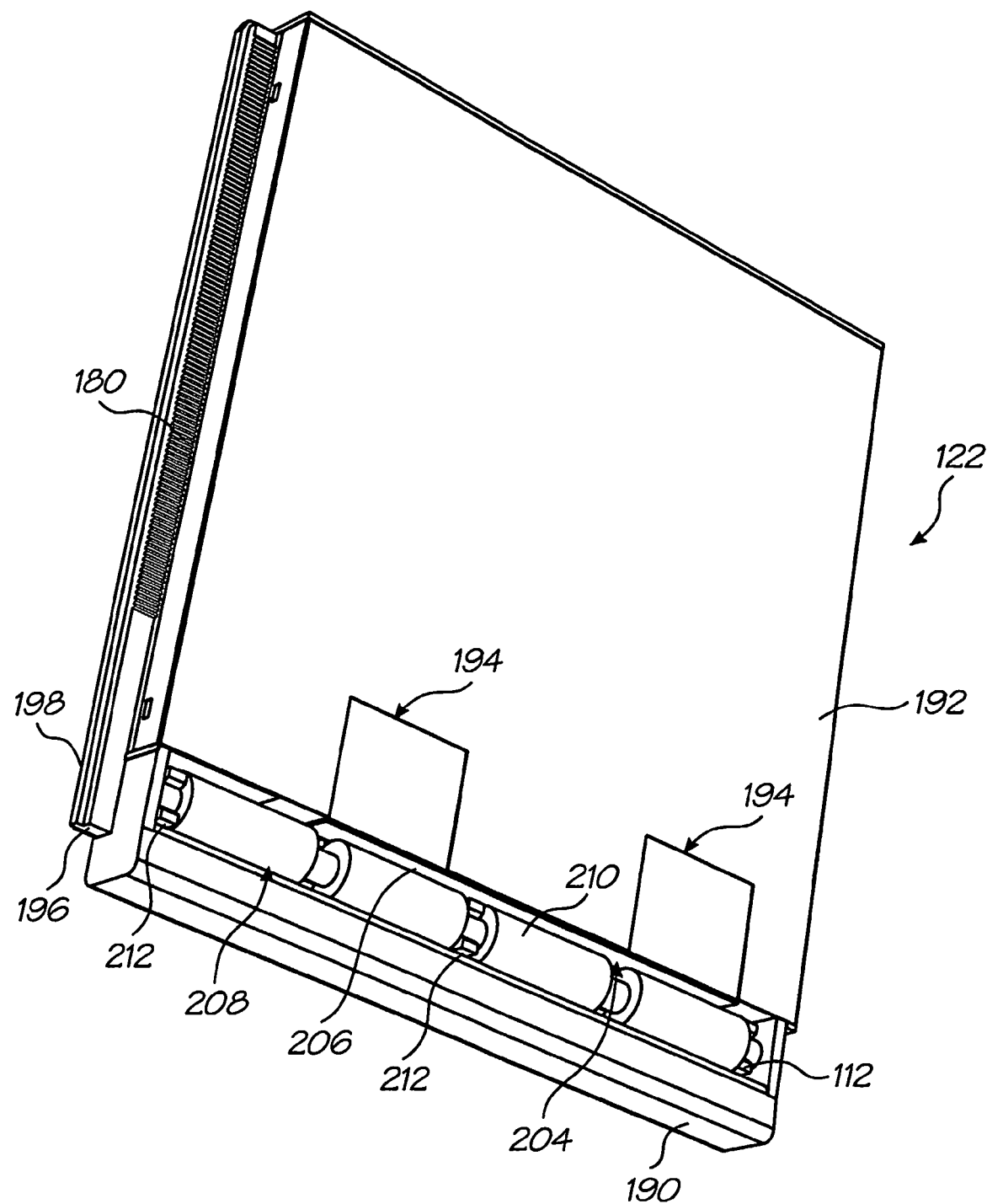
FIG. 6 shows a three dimensional view of a cartridge for the printer.
Figure 7:
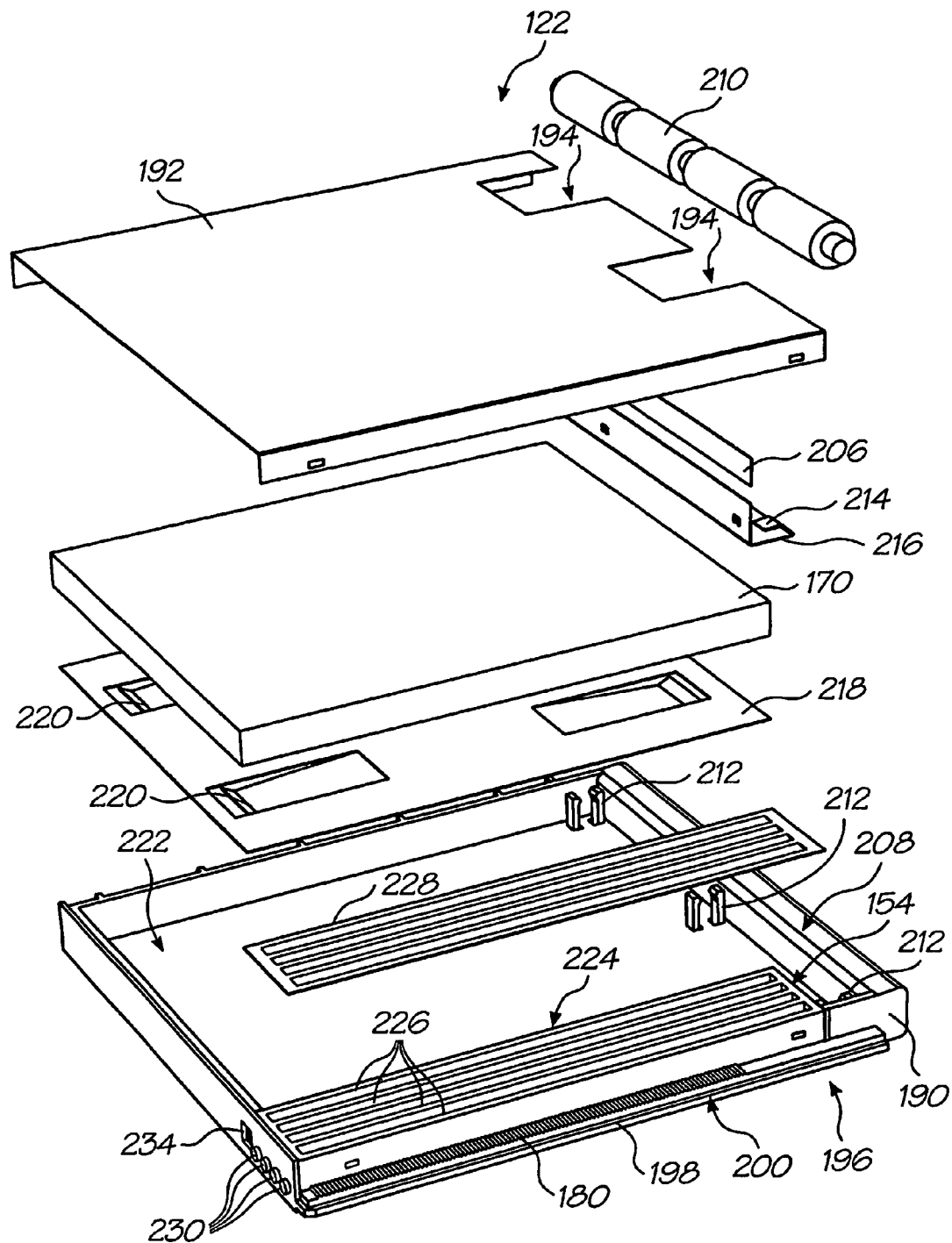
FIG. 7 shows a three dimensional, exploded view of the cartridge.

Referring now to FIGS. 6 and 7 of the drawings, the cartridge 122 is described in greater detail.

The cartridge 122 comprises a base molding 190. The base molding 190 is closed off by a metal cover 192. The cover 192 has a pair of transversely spaced openings 194 defined in a front edge thereof. These openings 194 permit the pick up roller 168 of the printer 100 to engage a topmost sheet of the stack 170 of paper within the cartridge 122.

A toothed rack 196 is provided on one side of the cartridge 122. The toothed rack 196 defines the upper rack 180 which is engaged by a gear of the first gear train 144 for insertion of the cartridge 122 into, or its ejection from, the printer 100. A rib 198 extends longitudinally along the side of the toothed rack 196. The rib 198 is received in the slot 158 in the side molding 146 of the printer 100. A lower surface of the toothed rack 196 also has one of the longitudinally extending racks 200 (FIG. 7) for engagement with one of the cogs 164. An opposed side of the base molding 190 of the cartridge 122 carries the other of the longitudinally extending racks 202 which engages the other cog 164 for inhibiting skewing of the cartridge 122 when it is inserted into, or ejected from, the printer 100.

A feed slot 204 is defined at a front edge of the metal cover through which a sheet of paper to be printed is passed in use. The feed slot 204 is partially defined by a plastics strip 206 which inhibits more than one sheet of paper being fed to the printhead 300 at any one time.

A transversely extending trough 208 is defined outwardly of the strip 206. The trough 208 accommodates a sprung roller 210 therein. The roller 210 is supported in the trough 208 via a plurality of clips 212.

The roller 210 is biased upwardly relative to a base of the trough 208 via a plurality of leaf springs 214. The leaf springs 214 are formed integrally with an L-shaped metal bracket 216 which partially forms the trough 208. The roller 210 is a snap-fit in the clips 212.

A platen 218 is accommodated in the base molding 190. The platen 218 is spring biased via a plurality of leaf springs 220 which engage a floor 222 of the base molding 190 for urging the stack 170 of paper against the cover 192.

The ink supply reservoir 154 includes an ink supply molding 224 formed integrally with the base molding 190. The ink supply molding 224 defines a plurality of ink supply channels 226. Each ink supply channel 226 contains a particular color of ink. In this context, the term "color" is to be understood as including inks which are invisible in the visible spectrum such as, for example, infra red inks.

The channels 226 are closed off by a flexible bladder-like membrane 228 which is heat-sealed to the molding 224. It will be appreciated that, as ink is withdrawn from each channel 226, the associated membrane 228 collapses into the channel 226 thereby inhibiting the ingress of air into that channel 226.

Each channel 226 communicates with an ink outlet 230. Each ink outlet 230 is in the form of a rupturable seal.

As shown in greater detail in FIG. 4 of the drawings, the ink supply manifold 156 of the printer 100 includes pins 232. These pins 232 communicate with the ink supply hoses 152. When the cartridge 122 is inserted into the printer 100, and the cartridge 122 is driven home by the gear train 144, the pins 232 pierce the seals 230 to place the hoses 152 in communication with their associated ink supply channels 226.

The cartridge 122 includes a quality assurance chip 234. This chip 234 ensures correct communications between the cartridge 122 and the printer 100 and that the cartridge 122 is of the required quality. The chip 234 communicates with the printer 100 via chip contacts 236 mounted on the ink supply manifold 156 of the printer 100. Thus, when the cartridge 122 is driven home by the gear train 144, the chip 234 engages the contacts 236 for enabling communications to be established between the chip 234 and the circuit board 136 of the printer 100.

The cartridge 122 is a disposable unit so that, once its ink supply and paper supply have been depleted, the cartridge is disposed of Instead, the cartridge 122 may be re-useable. In the latter case, once the supply of ink and paper in the cartridge 122 have been depleted and the cartridge 122 is ejected from the printer 100, the used, empty cartridge 122 can be taken by a user to a supplier for a refund. It is to be noted that the cartridge 122 is automatically ejected from the printer 100 once its supply of paper and/or ink has been depleted.

Referring to FIGS. 8 to 14 of the drawings, the printhead 300 is described in greater detail. The printhead 300 comprises an array, which will be described in greater detail below, of nozzle assemblies. In a particularly preferred form, the printhead includes Memjet technology as described in the patent applications and patents listed in the paragraph headed "Related Patent Applications and Patents", at page 2, the disclosure of which is incorporated herein by way of explicit reference.

Figure 8:
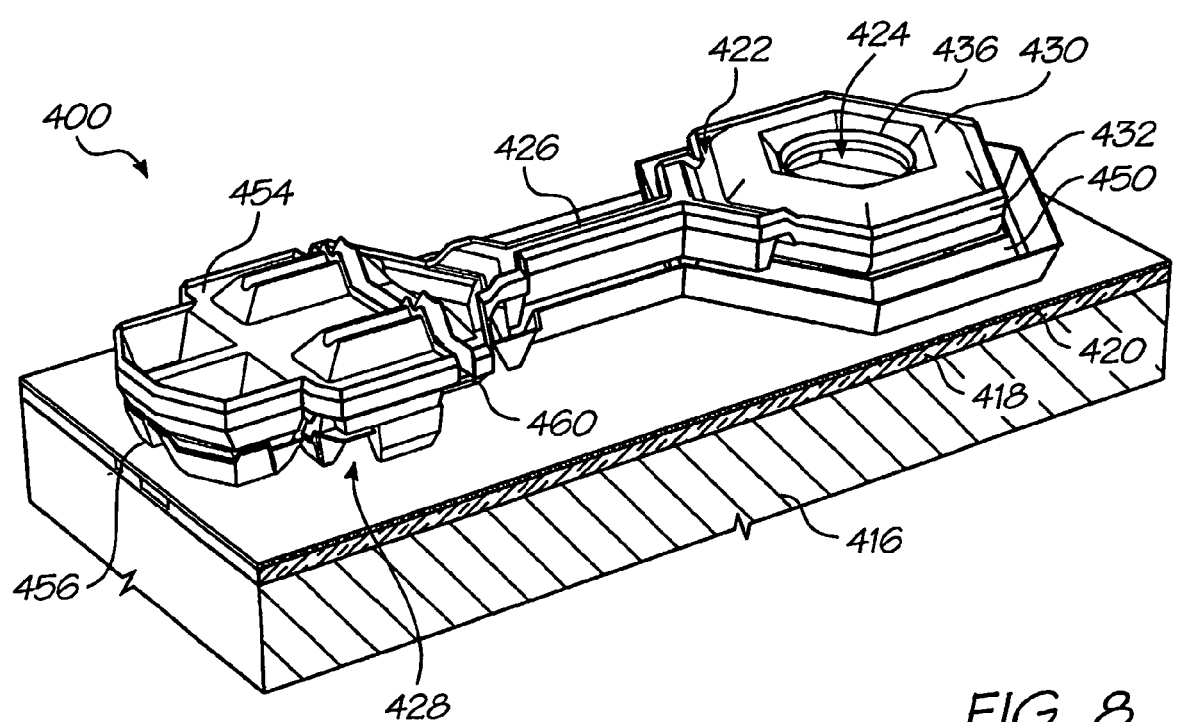
FIG. 8 shows a three dimensional, schematic view of a nozzle assembly for an ink jet printhead for the printer.

Referring to FIG. 8 of the drawings, a nozzle assembly is illustrated and is designated generally by the reference numeral 400.

The assembly 400 includes a silicon substrate or wafer 416 on which a dielectric layer 418 is deposited. A CMOS passivation layer 420 is deposited on the dielectric layer 418.

Each nozzle assembly 400 includes a nozzle 422 defining a nozzle opening 424, a connecting member in the form of a lever arm 426 and an actuator 428. The lever arm 426 connects the actuator 428 to the nozzle 422.

Figures 9, 10, 11:
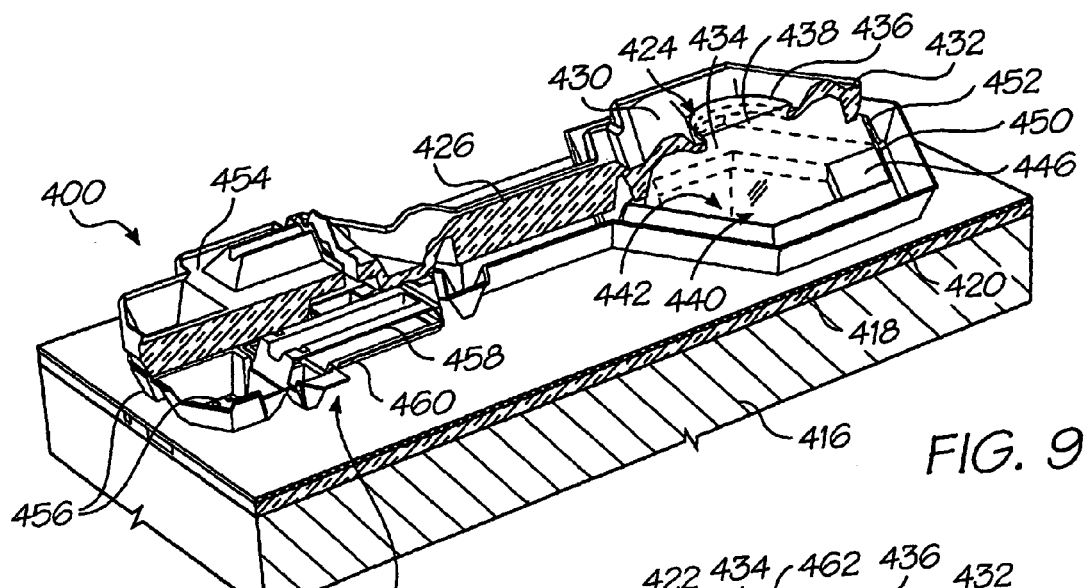
FIGS. 9 to 11 show a three dimensional, schematic illustration of an operation of the nozzle assembly of FIG. 8.

As shown in greater detail in FIGS. 9 to 11 of the drawings, the nozzle 422 comprises a crown portion 430 with a skirt portion 432 depending from the crown portion 430. The skirt portion 432 forms part of a peripheral wall of a nozzle chamber 434. The nozzle opening 424 is in fluid communication with the nozzle chamber 434. It is to be noted that the nozzle opening 424 is surrounded by a raised rim 436 which "pins" a meniscus 438 (FIG. 9) of a body of ink 440 in the nozzle chamber 434.

An ink inlet aperture 442 (shown most clearly in FIG. 13 of the drawings) is defined in a floor 446 of the nozzle chamber 434. The aperture 442 is in fluid communication with an ink inlet channel 448 defined through the substrate 416.

A wall portion 450 bounds the aperture 442 and extends upwardly from the floor portion 446. The skirt portion 432, as indicated above, of the nozzle 422 defines a first part of a peripheral wall of the nozzle chamber 434 and the wall portion 450 defines a second part of the peripheral wall of the nozzle chamber 434.

The wall 450 has an inwardly directed lip 452 at its free end which serves as a fluidic seal which inhibits the escape of ink when the nozzle 422 is displaced, as will be described in greater detail below. It will be appreciated that, due to the viscosity of the ink 440 and the small dimensions of the spacing between the lip 452 and the skirt portion 432, the inwardly directed lip 452 and surface tension function as a seal for inhibiting the escape of ink from the nozzle chamber 434.

The actuator 428 is a thermal bend actuator and is connected to an anchor 454 extending upwardly from the substrate 416 or, more particularly, from the CMOS passivation layer 420. The anchor 454 is mounted on conductive pads 456 which form an electrical connection with the actuator 428.

The actuator 428 comprises a pair of first, active beams 458 arranged above a pair of second, passive beams 460. In a preferred embodiment, both pairs of beams 458 and 460 are of, or include, a conductive ceramic material such as titanium nitride (TiN).

Both pairs of beams 458 and 460 have their first ends anchored to the anchor 454 and their opposed ends connected to the arm 426. When a current is caused to flow through the active beams 458 thermal expansion of the beams 458 result. As the passive beams 460, through which there is no current flow, do not expand at the same rate, a bending moment is created causing the arm 426 and, hence, the nozzle 422 to be displaced downwardly towards the substrate 416 as shown in FIG. 10 of the drawings. This causes ejection of ink through the nozzle opening 424 as shown at 462 in FIG. 10 of the drawings. When the source of heat is removed from the active beams 458, i.e. by stopping current flow, the nozzle 422 returns to its quiescent position as shown in FIG. 11 of the drawings. When the nozzle 422 returns to its quiescent position, an ink droplet 464 is formed as a result of the breaking of an ink droplet neck as illustrated at 466 in FIG. 11 of the drawings. The ink droplet 464 then travels on to the print media such as a sheet of paper. As a result of the formation of the ink droplet 464, a "negative" meniscus is formed as shown at 468 in FIG. 11 of the drawings. This "negative" meniscus 468 results in an inflow of ink 440 into the nozzle chamber 434 such that a new meniscus 438 is formed in readiness for the next ink drop ejection from the nozzle assembly 400.

Figure 12:
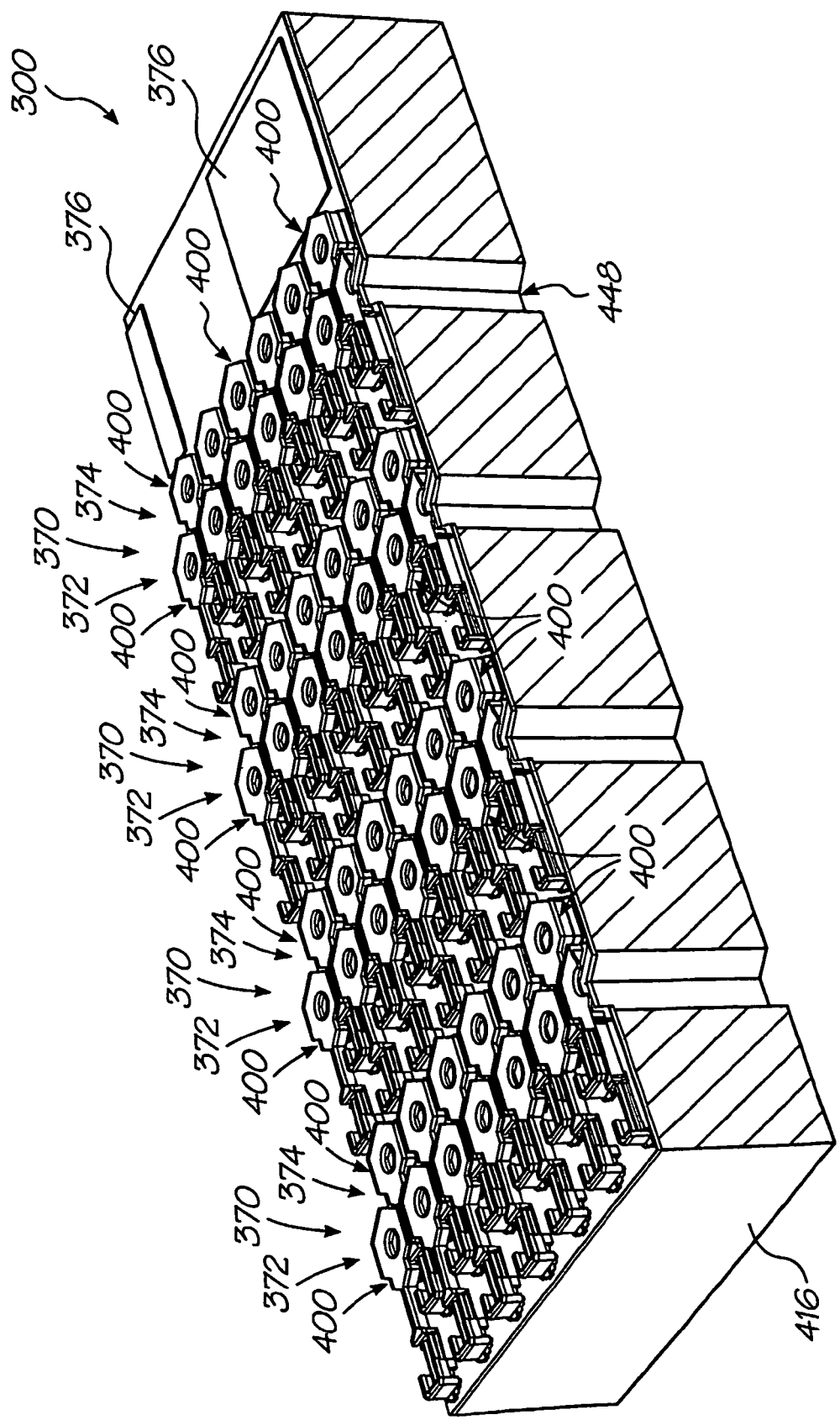
FIG. 12 shows a three dimensional view of a nozzle array constituting the printhead.
Figure 13:
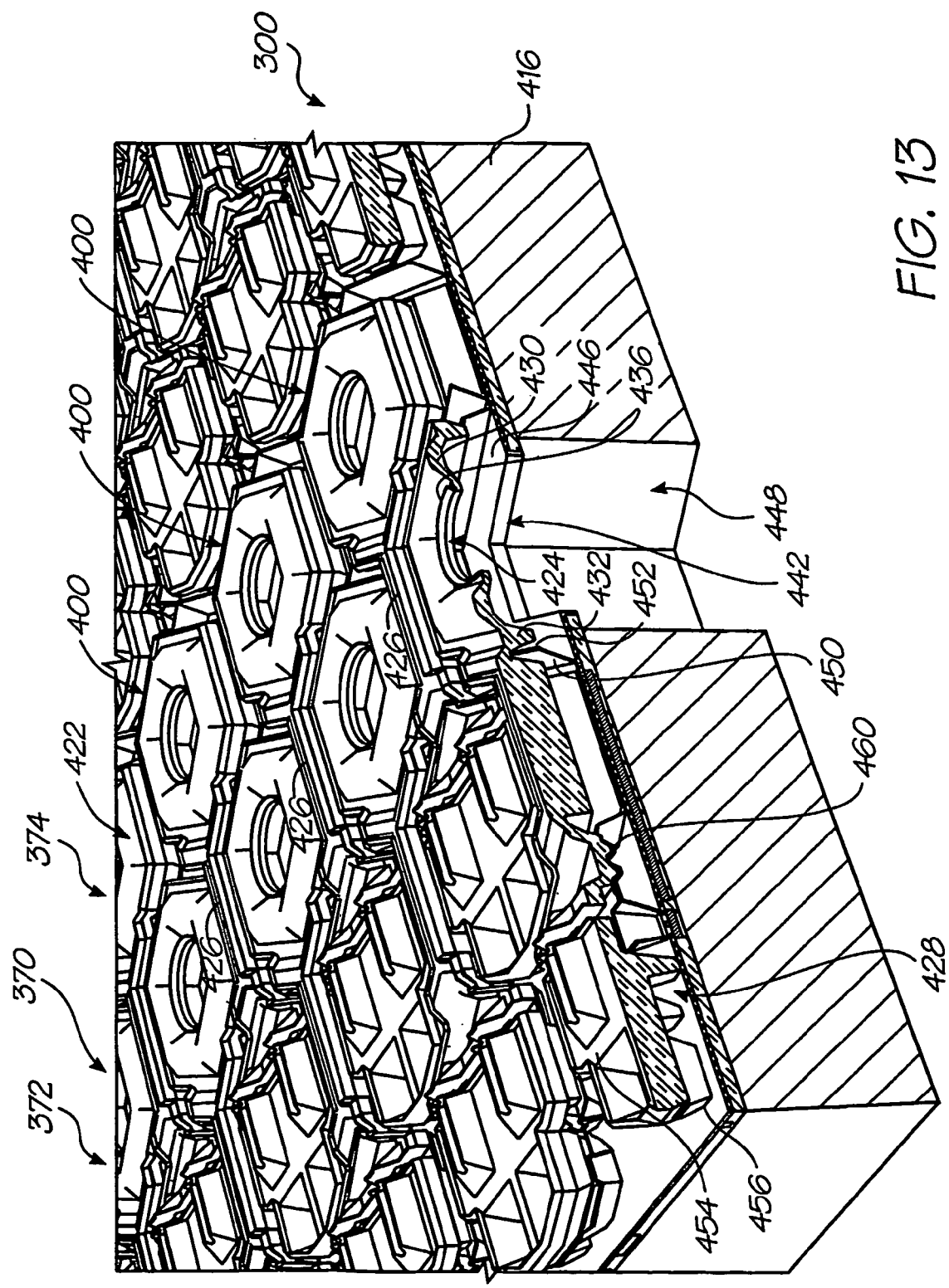
FIG. 13 shows, on an enlarged scale, part of the array of FIG. 12.
Figure 14:
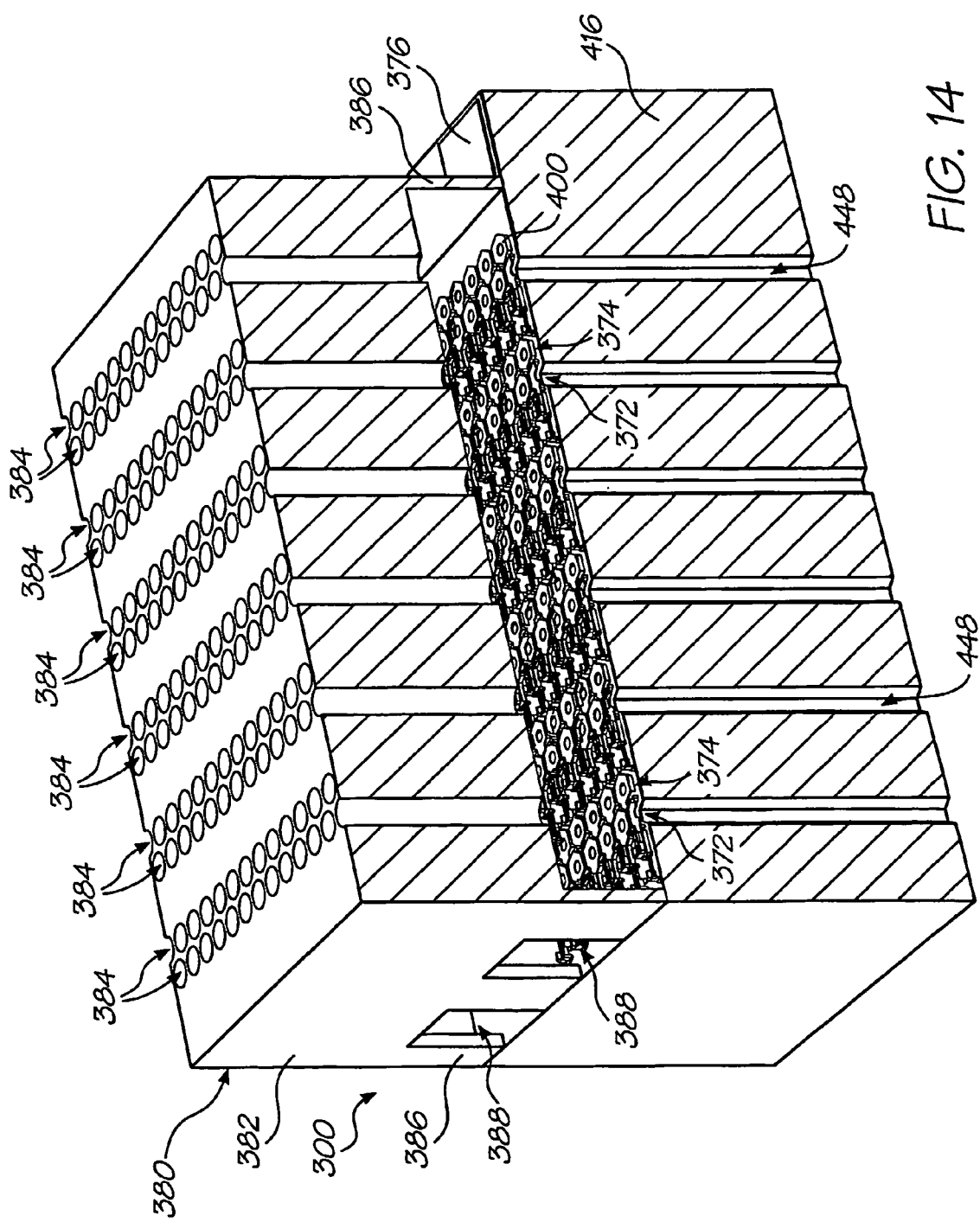
FIG. 14 shows a three dimensional view of the printhead including a nozzle guard.

Referring now to FIGS. 12 to 14 of the drawings, a part of the printhead 300 is described in greater detail. The printhead 300 is a four color printhead. Accordingly, the printhead 300 includes four groups 370 of nozzle assemblies, one for each color. Each group 370 has its nozzle assemblies 400 arranged in two rows 372 and 374. One of the groups 370 is shown in greater detail in FIG. 13 of the drawings.

To facilitate close packing of the nozzle assemblies 400 in the rows 372 and 374, the nozzle assemblies 400 in the row 374 are offset or staggered with respect to the nozzle assemblies 400 in the row 372. Also, the nozzle assemblies 400 in the row 372 are spaced apart sufficiently far from each other to enable the lever arms 426 of the nozzle assemblies 400 in the row 374 to pass between adjacent nozzles 422 of the assemblies 400 in the row 372. It is to be noted that each nozzle assembly 400 is substantially dumbbell shaped so that the nozzles 422 in the row 372 nest between the nozzles 422 and the actuators 428 of adjacent nozzle assemblies 400 in the row 374.

Further, to facilitate close packing of the nozzles 422 in the rows 372 and 374, each nozzle 422 is substantially hexagonally shaped.

The substrate 416 has bond pads 376 arranged thereon which provide the electrical connections, via the pads 456, to the actuators 428 of the nozzle assemblies 400. These electrical connections are formed via the CMOS layer (not shown).

A nozzle guard 380 is mounted on the substrate 416 of the printhead 300. The nozzle guard 380 includes a body member 382 having a plurality of passages 384 defined therethrough. The passages 384 are in register with the nozzle openings 424 of the nozzle assemblies 400 of the printhead 300 such that, when ink is ejected from any one of the nozzle openings 424, the ink passes through the associated passage 384 before striking the print media.

The body member 382 is mounted in spaced relationship relative to the nozzle assemblies 400 by limbs or struts 386. One of the struts 836 has air inlet openings 388 defined therein.

When the printhead 300 is in operation, air is charged through the inlet openings 388 to be forced through the passages 384 together with ink travelling through the passages 384. The purpose of the air is to maintain the passages 384 clear of foreign particles. A danger exists that these foreign particles, such as dust particles, could fall onto the nozzle assemblies 400 adversely affecting their operation. With the provision of the air inlet openings 388 in the nozzle guard 380 this problem is, to a large extent, obviated.

In another embodiment of the invention, the printer 100 is built into and forms part of an in-car entertainment unit 500, as shown in FIG. 17 of the drawings.

The ICE unit 500, in addition to a CD player 502 and a radio having controls 504, includes a full color LCD 506. The unit 500 functions as a satellite navigation unit and may also be used for receiving television signals. The unit 500 incorporates a printer 100 of the type described above. The unit 500 includes a bank of control buttons 508. This bank of buttons 508 constitutes GPS controls and is used for satellite navigation purposes. In addition, the unit includes the user terminal 26 which is provided for controlling the printer 100 and the content printed by the printer 100.

In use, a user of the system 10 uses the user terminal 26 to request required information from the vehicle management sub-system 12. In addition, or instead, the sub-system 12 produces information which it regards as necessary to be brought to the attention of an operator of the vehicle and which is displayed on the display of the user terminal 26. In producing this information, the sub-system 12 makes use of data produced by, inter alia, the location determining unit 18 and the locality data retrieval sub-system 24. In addition, the sub-system 12 uses sensors within the vehicle to provide information regarding operating aspects of the vehicle.

A previously described, locality data is provided on data line 22 from the sub-system 24. These locality data includes data such as the location of waypoints, for example, service stations which may be required to be visited by a user of the vehicle. The location data output on line 20 from the unit 18 is in the form of navigational positioning information which is used to determine the current location of the vehicle.

One possible application of the system 10 is its use in determining servicing requirements of the vehicle such as by making recommendations about scheduled servicing or reporting items which require servicing.

If the vehicle management sub-system 12 determines that the vehicle is due for a service such as a scheduled service it determines the location of the nearest suitable service station by using the location determining unit 18 and the sub-system 24. The relevant data with the addition of the type of service required, as recommended by the vehicle management sub-system 12, is displayed on the user terminal 26 and can be printed by the user via the printer 100 for reference by the user.

This information may be reproduced at any time by use of the user terminal 26 or may be produced automatically by the sub-system 12 in advance of a due date for a service.

The user may also request a printed copy of various details concerning a current state of serviceable items of the vehicle by means of the user terminal 26. For example, the user may request a download of information regarding fluid levels of the vehicle such as brake fluid, oil, coolant, transmission fluid, or the like. Still further, where appropriate sensors are incorporated in the vehicle other mechanical details such as tyre pressures or suspension settings can be downloaded for replenishment or adjustment.

Another application of the system 10 is its use in record keeping for taxation purposes. Running costs associated with vehicles that are used both for business and personal use are, in certain jurisdictions, able to be reclaimed as a tax deduction or at least a portion of such use may be reclaimed for tax deduction purposes. In order to reduce the burden on a vehicle owner of maintaining a log book so that an apportionment between business and personal use can be made, the sub-system 12 can be programmed to automatically record usage. This is possible by having the sub-system 12 record start and end points of each journey made and the distance travelled between these points.

From a hard copy of trips undertaken during a financial year, the apportionment of travel between business and personal use can be easily evaluated.

Still further, for a fuel conscious driver the sub-system 12 can be programmed to periodically report fuel usage patterns in hard copy format such that trends may be observed by a driver. This will then enable the driver to adapt driving habits, change routes or attend to fine tuning of the vehicle in order to minimise fuel consumption.

Still another application of the system 10 is its use in hire vehicles such as taxis. Taxis commonly have metering systems that perform measurement of distance travelled and time elapsed in order to enable a fare to be calculated. These meters often have facilities for adding surcharges to the metered fare to account for details such as pre-booking fees, baggage handling fees, or the like. A taxi meter is, in fact, a form of vehicle management sub-system and its functions can be performed by the sub-system 12 of the system 10. Thus, the system 10 can be used in a taxi for enabling a passenger conveyed in the taxi to obtain a receipt for their journey by way of the printer 100. The receipt could contain additional information not generally available from existing metering systems such as the route taken, time elapsed, fare breakdown or the like.

Accordingly, it is an advantage of the invention that a system 10 is provided which facilitates the production of hard copies of information regarding operation of a vehicle. This facilitates servicing of the vehicle and also record keeping in respect of the vehicle for taxation purposes. Still further, the system 10 could be integrated into a vehicle where the vehicle is used for public hire purposes such as in the case of a taxi without the need for additional, separate taxi meters.

Although the invention has been described with reference to a number of specific embodiments, it will be appreciated by those skilled in the art that the invention can be embodied in many other forms.

The invention claimed is:

1. An information retrieval system for retrieving and processing information relating to a current state of one or more serviceable items of a conveyance, the system including:
   a data collecting means for collecting data on the one or more serviceable items from respective sensors, the data collecting means collecting the data in an unformatted form;
   a subsystem operable to monitor the collected data and determine from the collected data a current state of the one or more serviceable items, the subsystem further operable to determine if any of the one or more serviceable items requires servicing;
   a layout engine operable to receive the collected data in an unformatted form, and to format the data to conform to a user selected template;
   a processing means, in communication with said data collecting means and said subsystem, for processing said formatted collected data into a page description language;
   a printing unit, installed in said conveyance, for printing said formatted data according to the page description language;
   a cartridge for holding print media and ink, the cartridge adapted for insertion into the printing unit, and provided with a toothed rack on one side thereof; and
   a user terminal for providing a user interface to said data collecting means, said subsystem, said processing means, and said printing unit, wherein
   the toothed rack engages the printing unit upon insertion of the cartridge into the printing unit, whereby skewing of the cartridge with respect to the printing unit is inhibited.

2. The system of claim 1, in which the sub-system periodically produces information relating to the current state of said one or more serviceable items to the display unit for viewing by the user without user intervention.

3. The system of claim 1, in which the user terminal is further operable to enable the user to access desired information on demand.

4. The system of claim 1 in which the data collecting means includes a location determining unit, and the data collecting means is further operable to determine the location of the conveyance via the location determining unit.

5. The system of claim 4 in which the location determining unit provides the location of the conveyance as a set of coordinates.

6. The system of claim 4 in which the location determining unit comprises a global positioning system (GPS) receiver.

7. The system of claim 4 in which the data collecting means further includes a locality data retrieval unit which retrieves data relating to the location in response to the receipt of data from the location determining unit.

8. The system of claim 7 in which the location data retrieval unit comprises a locality information sub-system which provides data relating to an establishment of relevance to a user of the conveyance.

9. The system of claim 1 in which the processing means includes the layout engine in communication with the data collecting means.

10. The system of claim 9, in which the processing means comprises a data manipulating means in communication with the layout engine for manipulating the data to provide the formatted data.

11. The system of claim 10 in which the printing unit includes a printer controller, for receiving the formatted data to be printed, and a printer.

12. The system of claim 11 in which the printer is a full color printer.

13. The system of claim 12 in which said printer is a photo quality color printer.

14. The system of claim 12 in which the printer is an ink jet printer.

15. The system of claim 14 in which the printer comprises a pagewidth ink jet printhead.

16. The system of claim 15 in which the printhead comprises an array of nozzles, said array having been fabricated by microelectromechanical techniques.

17. A method of retrieving and processing information relating to a current state of one or more serviceable items of a conveyance, the method including the steps of:
    collecting data on the one or more serviceable items from respective sensors, the data being collected in an unformatted form;
    monitoring the collected data and determining a current state of the one or more serviceable items;
    formatting the collected data to conform to a user selected template;
    processing said formatted collected data into a page description language;
    transmitting the page description language to a printing unit installed in the conveyance, the page description language being transmitted along an existing wiring loom of the conveyance;
    inserting a print media and ink cartridge into the printing unit, the step of inserting including engaging a toothed rack of the cartridge with the printing unit to inhibit skewing of the cartridge with respect to the printing unit; and
    printing said formatted data according to the page description language, when required by a user, on the printing unit installed in said conveyance, wherein
    one or more steps of the method are executable via a user terminal installed in said conveyance.

18. The method of claim 17, further including a step of periodically producing information for viewing by the user without user intervention.

19. The method of claim 17, further including a step of enabling the user to access desired information on demand.

20. The method of claim 17, further including a step of determining the location of the conveyance.

21. The method of claim 20, further including a step of providing the location of the conveyance as a set of coordinates.

22. The method of claim 17, further including a step of retrieving data relating to a locality in which the conveyance is located.

23. The method of claim 22, further including a step of providing data relating to an establishment in the locality which is of relevance to the conveyance.

24. The method of claim 17, further including a step of manipulating said data elements prior to printing the data to provide said formatted data.

25. An onboard information retrieval system for retrieving information relating to an operation of a vehicle, the system including:
    a data collecting means for collecting data relating to operational aspects of the vehicle, the data collecting means operable to collect data from a plurality of sensors, which data is provided from the plurality of sensors in an unformatted form;

a subsystem operable to monitor the collected data and perform one or more preprogrammed analyses of the collected data to obtain user relevant information, said user relevant information indicative of one or more operational characteristics of the vehicle;

a layout engine operable to receive the user relevant information in an unformatted form, and to format the user relevant information to conform to a user selected template;

a processing means for processing said user relevant information into a page description language;

a print unit, installed in said vehicle, for printing said formatted data in accordance with the page description language; and a cartridge for holding print media and ink, the cartridge adapted for insertion into the printing unit, and provided with a toothed rack on one side thereof, wherein the subsystem is operable to perform one or more preprogrammed analyses selected from a group consisting of: a distance travelled during a particular mode of use of the vehicle, and an amount of fuel used, and the toothed rack engages the printing unit upon insertion of the cartridge into the printing unit, whereby skewing of the cartridge with respect to the printing unit is inhibited.

26. The system of claim 25 in which the collected data includes data relating to replenishable items of the vehicle.

27. The system of claim 25 in which, the mode of use of the vehicle is a mode where the vehicle is used for personal purposes.

28. The system of claim 25 in which the mode of use of the vehicle is a mode where the vehicle is used for business purposes.

29. A method of retrieving information relating to an operation of a vehicle, the method including the steps of:

collecting data relating to operating aspects of the vehicle, the data being collected in an unformatted form;

monitoring the collected data and performing one or more preprogrammed analyses of the collected data to obtain user relevant information indicative of one or more operational characteristics of the vehicle;

formatting the unformatted user relevant information to conform to a user selected template;

processing said user relevant information into a page description language;

transmitting the page description language to a printing unit installed in the conveyance, the page description language being transmitted along an existing wiring loom of the conveyance;

inserting a print media and ink cartridge into the printing unit, the step of inserting including engaging a toothed rack of the cartridge with the printing unit to inhibit skewing of the cartridge with respect to the printing unit; and reproducing a hard copy of said formatted data on the printer unit installed in said vehicle, wherein the one or more preprogrammed analyses is selected from a group consisting of: a distance travelled during a particular mode of use of the vehicle, and an amount of fuel used.

30. The method of claim 29, further including a step of providing information relating to replenishable items of the vehicle.

31. The method of claim 29, wherein the mode of use of the vehicle is a mode where the vehicle is used for personal purposes.

32. The method of claim 29, wherein the mode of use of the vehicle is a mode where the vehicle is used for business purposes.

* * * * *